United States Patent
Imamura

(10) Patent No.: US 10,059,305 B2
(45) Date of Patent: Aug. 28, 2018

(54) VEHICLE COMMUNICATION SYSTEM

(71) Applicant: DENSO CORPORATION, Kariya, Aichi-pref. (JP)

(72) Inventor: Hikaru Imamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 52 days.

(21) Appl. No.: 15/327,045

(22) PCT Filed: Jul. 10, 2015

(86) PCT No.: PCT/JP2015/003513
§ 371 (c)(1),
(2) Date: Jan. 18, 2017

(87) PCT Pub. No.: WO2016/017089
PCT Pub. Date: Feb. 4, 2016

(65) Prior Publication Data
US 2017/0190318 A1    Jul. 6, 2017

(30) Foreign Application Priority Data

Jul. 28, 2014 (JP) ................................. 2014-152738

(51) Int. Cl.
*B60R 25/01* (2013.01)
*B60R 25/24* (2013.01)
(Continued)

(52) U.S. Cl.
CPC ............ *B60R 25/241* (2013.01); *B60R 25/01* (2013.01); *B60R 25/209* (2013.01); *E05B 81/64* (2013.01);
(Continued)

(58) Field of Classification Search
CPC ..... B60R 25/241; B60R 25/01; B60R 25/209; B60R 2325/205; G07C 2209/63
(Continued)

(56) References Cited

U.S. PATENT DOCUMENTS

2013/0237189 A1    9/2013  Nishidai
2015/0120151 A1*   4/2015  Akay ................... B60R 25/24
                                                    701/49
2016/0001743 A1*   1/2016  Okada .................. B60R 25/406
                                                    701/2

FOREIGN PATENT DOCUMENTS

JP          2013185376 A      9/2013

OTHER PUBLICATIONS

"Parking Location in Google Now", Internet Citation, Jul. 28, 2014, URL: <https://support.google.com/websearch/answer/6015842?ha+ja>.
(Continued)

*Primary Examiner* — Nadeem N Odeh
(74) *Attorney, Agent, or Firm* — Harness, Dickey & Pierce, P.L.C.

(57) ABSTRACT

A vehicle communication system includes a vehicle mounted device equipped to a vehicle, a mobile device carried by a user and performing a wireless communication with the vehicle side communication unit, a mobile terminal carried by the user and performing a wireless communication with the mobile device. The mobile terminal acquires a parking position of the vehicle when the user gets off the vehicle, detects a position of the mobile terminal, and calculates a distance between the parking position and the mobile terminal based on the parking position and the position of the mobile terminal. When the calculated distance falls within a predetermined range, the mobile terminal transmits, to the mobile device, distance information including the calculated distance. When receiving the distance
(Continued)

information, the mobile device transmits, to the vehicle mounted device, approach information including the distance information.

9 Claims, 5 Drawing Sheets

(51) Int. Cl.
*B60R 25/20* (2013.01)
*E05B 81/64* (2014.01)
*H04W 8/00* (2009.01)
*H04W 76/02* (2009.01)
*G07C 9/00* (2006.01)
*H04W 4/02* (2018.01)
*G01S 19/13* (2010.01)
*H04W 76/11* (2018.01)
*H04W 4/00* (2018.01)
*H04W 84/12* (2009.01)
*H04W 76/14* (2018.01)
*H04W 4/80* (2018.01)

(52) U.S. Cl.
CPC .......... *G01S 19/13* (2013.01); *G07C 9/00309* (2013.01); *H04W 4/023* (2013.01); *H04W 8/005* (2013.01); *H04W 76/021* (2013.01); *H04W 76/11* (2018.02); *B60R 2325/205* (2013.01); *H04W 4/008* (2013.01); *H04W 4/80* (2018.02); *H04W 76/023* (2013.01); *H04W 76/14* (2018.02); *H04W 84/12* (2013.01)

(58) Field of Classification Search
USPC .............................................................. 701/2
See application file for complete search history.

(56) References Cited

OTHER PUBLICATIONS

"Tokyo Motor Show 2013: Vehicle State is Available from Smart Phone! Report of OMRON's Exhibition on 'Next Generation Key' Which Connects with Vehicle Key Using Bluetooth", Internet Citation, Livedoor News, Nov. 25, 2013.

* cited by examiner

VEHICLE COMMUNICATION SYSTEM

CROSS REFERENCE TO RELATED APPLICATIONS

This application is a U.S. National Phase Application under 35 U.S.C. 371 of International Application No. PCT/JP2015/003513 filed on Jul. 10, 2015 and published in Japanese as WO 2016/017089 A1 on Feb. 4, 2016. This application is based on and claims the benefit of priority from Japanese Patent Application No. 2014-152738 filed on Jul. 28, 2014. The entire disclosures of all of the above applications are incorporated herein by reference.

TECHNICAL FIELD

The present disclosure relates to a vehicle communication system.

BACKGROUND ART

A smart entry system is one of vehicle communication systems for realizing various functions in a vehicle based on a wireless communication between a mobile device carried by a user and a vehicle mounted device equipped to a vehicle. The smart entry system performs an authentication through the wireless communication between the mobile device and the vehicle mounted device, and can perform operation desired by a user, such as unlocking of a door locking device, opening of a trunk door, or an engine start on the basis of an authentication result, even without using a mechanical key.

In recent years, a communication system has been proposed (refer to Patent Literature 1) as follows. The communication system can execute a predetermined application program on a mobile terminal, such as a smartphone, display a command or vehicle information which is acquired through the mobile device, or can transmit a command or information to the vehicle from the mobile terminal directly or through the mobile device.

In addition, a technique in which the smartphone per se automatically recognizes getting-off of the user from the vehicle, and acquires and stores a parking position as GPS data is disclosed (refer to Non Patent Literature 1).

In a conventional smart entry system according to Patent Literature 1, a radio wave of an LF (long wave) band (hereinafter abbreviated as "LF radio wave") is periodically transmitted from the vehicle, and the mobile device receives the LF radio wave, and responds to the vehicle with a radio wave of an RF (high frequency) band (hereinafter abbreviated as "RF radio wave"), to thereby estimate a mobile device position in the vicinity of the vehicle. Because the LF radio wave can control a propagation distance, an output is set so that the LF radio wave reaches only the vicinity of the vehicle, taking security or a dark current into consideration.

As described above, in the vehicle communication system, a position estimation of the mobile device is an important factor in functioning the system. If an estimatable range of the distance from the vehicle to the mobile device is long, a variety of convenience can be provided to the user. However, in the currently used system, the vehicle side has an initiative of the communication, and with consideration of generation of dark current which is an electric problem and an unlock of the vehicle door by the mobile device in response to a receiving of LF radio wave from the vehicle which is a problem on the ensuring of security, it is difficult to increase a wireless communication range.

In addition, there is no disclosure or suggestion of a technique for operating in conjunction with the vehicle or the mobile device with the use of the parking position stored in the smartphone.

PRIOR ART LITERATURES

Patent Literature

[Patent Literature 1] JP 2013-185376 A

Non-Patent Literature

[Non-Patent Literature 1] "Parking location in Google Now" (https://support.google.com/websearch/answer/6015842?hl=ja), retrieved on Jul. 28, 2014

SUMMARY OF INVENTION

In view of the foregoing difficulties, it is an object of the present disclosure to provide a vehicle communication system capable of improving convenience for a user who moves closer to a vehicle, suppressing an increase of dark current, and ensuring security.

According to an aspect of the present disclosure, a vehicle communication system includes a vehicle mounted device, a mobile device, and a mobile terminal. The vehicle mounted device is equipped to a vehicle and includes a vehicle side communication unit. The mobile device is carried by a user, and includes a first mobile device communication unit which performs a wireless communication with the vehicle side communication unit. The mobile terminal is carried by the user, and includes a mobile terminal communication unit which performs a wireless communication with a second mobile device communication unit included in the mobile device. The mobile terminal include a parking position acquisition unit acquiring a parking position of the vehicle when the user gets off the vehicle, a position detection unit detecting a position of the mobile terminal, and a calculation unit calculating a distance between the parking position and the mobile terminal based on the parking position and the position of the mobile terminal. When the calculated distance falls within a predetermined range, the mobile terminal communication unit transmits, to the second mobile device communication unit, distance information including the distance. When the second mobile device communication unit receives the distance information, the first mobile device communication unit transmits, to the vehicle side communication unit, approach information including the distance information.

According to the above vehicle communication system, the convenience for a user who moves closer to the vehicle can be improved, an increase of the dark current can be suppressed, and security can be ensured.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
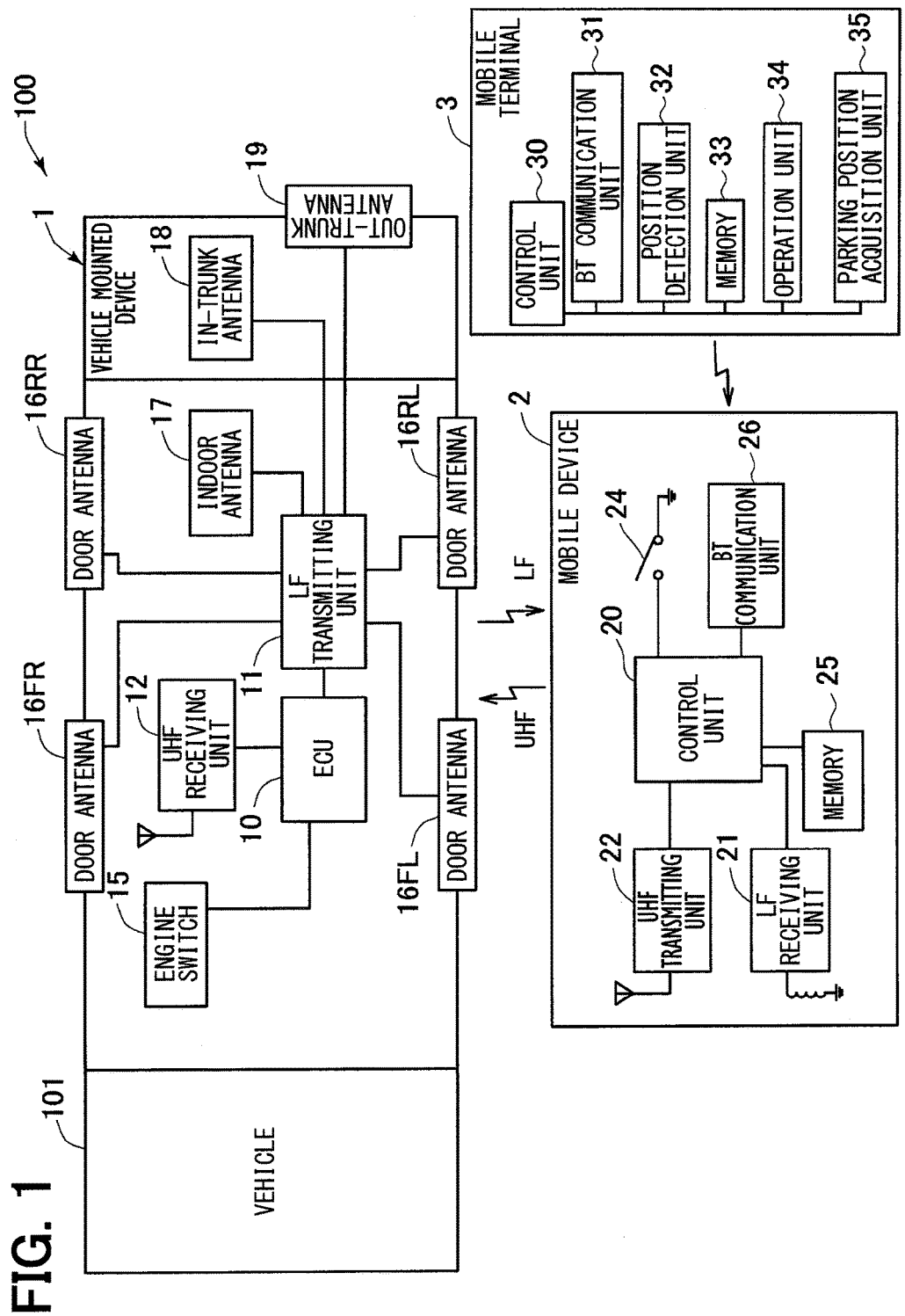
FIG. 1 is a diagram illustrating a configuration of a vehicle communication system.

As illustrated in FIG. 1, a vehicle communication system 100 according to an embodiment of the present disclosure includes a vehicle mounted device 1 equipped to a vehicle 101, a mobile device 2 carried by a user, and a mobile terminal 3.

The vehicle mounted device 1 includes an ECU 10 (corresponding to a selection unit, an estimation unit, and a checking unit), an LF transmitting unit 11 (corresponding to a vehicle side communication unit) connected to the ECU 10, a UHF receiving unit 12 (corresponding to a vehicle side communication unit), an engine switch 15, a door antenna 16 connected to the LF transmitting unit 11, an indoor antenna 17, an in-trunk antenna 18, and an out-trunk antenna 19. The door antenna 16 includes sub-antennas 16FR, 16RR, 16FL, and 16RL.

Figure 2:
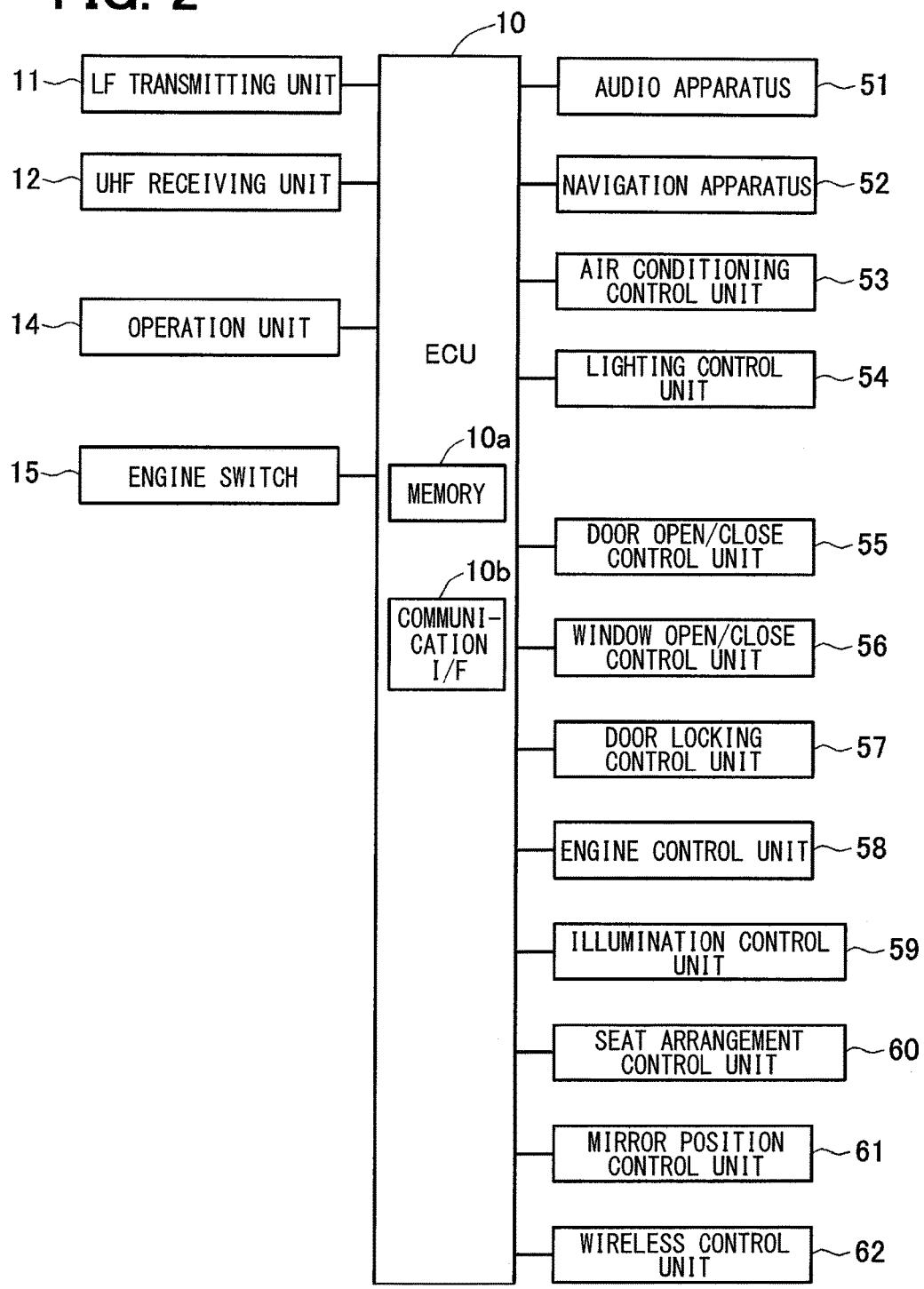
FIG. 2 is a diagram illustrating a connection of an ECU of a vehicle mounted device and other vehicle devices.

The ECU 10 illustrated in FIG. 2 is provided by a computer including a known CPU, a peripheral circuit such as a signal input/output circuit (each not shown), and a memory 10a (corresponding to a storage unit, a history storage unit, and a state storage unit) provided by a non-volatile storage medium such as a flash memory. The memory 10a stores a vehicle mounted device control program. The CPU executes the vehicle mounted device control program to realize various functions of the vehicle mounted device 1.

The LF transmitting unit 11 transmits a wireless signal (LF radio wave) as a request signal to the mobile device 2 with the use of, for example, a LF radio wave (long wave). This wireless signal reaches only a limited transmission area in the vicinity of the outside of a corresponding door, the vehicle interior, the inside of the trunk, and the vicinity of the outside of the trunk, through the door antenna 16, the indoor antenna 17, the in-trunk antenna 18, and the out-trunk antenna 19, respectively. For example, the wireless signal reaches only an area within 1 to 1.5 meter from the corresponding antenna.

The UHF receiving unit 12 receives the wireless signal (RF radio wave) transmitted from the mobile device 2 with the use of a radio wave of, for example, a UHF (ultra-high frequency) band or a high frequency (RF) band other than the UHF band. As a result, even if an output level of the mobile device 2 is relatively weak, a communication distance, for example, 10 to 30 meters is obtained, and the signal can be more surely transmitted to the vehicle mounted device 1.

The engine switch 15 is operated by a user when starting an engine (a motor in the case of a motor driven vehicle). When it is detected that the user operates the engine switch 15, the ECU 10 determines whether the engine start is permitted or not. When the engine start is permitted, the ECU 10 outputs an engine start permission signal to an engine control unit 58 (refer to FIG. 2).

The vehicle mounted device 1 switches between a normal mode and a sleep mode during operating state. The sleep mode has a lower power consumption compared with the normal mode. In the power saving mode, at least the UHF receiving unit 12 is in operating state. When the UHF receiving unit 12 receives approach information (details will be described later), the UHF receiving unit 12 transitions from the power saving mode to the normal mode, and transitions from the normal mode to the power saving mode after executing a predetermined process. The transition from the power saving mode to the normal mode is also called "wake-up", and the transition from the normal mode to the power saving mode is called "sleep".

The mobile device 2 includes a control unit 20, an LF receiving unit 21 (corresponding to a first mobile device communication unit) connected to the control unit 20, a UHF transmitting unit 22 (corresponding to the first mobile device communication unit), an operation unit 24, a memory 25 provided by a non-volatile storage medium such as a flash memory, and a BT communication unit 26 (corresponding to a second mobile device communication unit).

Similar to the ECU 10 of the vehicle mounted device 1, the control unit 20 is provided by a computer. The memory 25 stores a mobile device control program. The CPU executes the mobile device control program to realize various functions of the mobile device 2.

The LF receiving unit 21 receives the wireless signal transmitted from the vehicle mounted device 1 with the radio wave of the LF band. The UHF transmitting unit 22 transmits the wireless signal to the vehicle mounted device 1 with the radio wave of the UHF band.

The operation unit 24 includes one or more switches. The operation unit 24 executes a so-called keyless entry function such as locking or unlocking of the door and trunk opening operation in response to the user's operation.

The BT communication unit 26 receives data transmitted from the mobile terminal 3 with the use of a wireless communication technique such as BLUETOOTH (BLUETOOTH is a registered trademark, hereinafter referred to as "BT") or BLUETOOTH LOW ENERGY. In particular, because the BT can provide communicating between devices subjected to pairing setting in advance, a third party cannot intercept the communication contents, and security can be ensured.

The mobile device 2 switches between a normal mode and a sleep mode, which has lower power consumption than the normal mode, during an operating state. In the power saving mode, at least the LF receiving unit 21, the operation unit 24, and the BT communication unit 26 are in operating states. Functions irrelevant to the operation unit 24 for operating the control unit 20 and the receiving units are deactivated. When the operation unit 24 is operated or when the receiving unit receives the signal, the mobile device 2 transitions from the power saving mode to the normal mode, and transitions from the normal mode to the power saving mode after executing a predetermined process.

The vehicle mounted device 1 and the mobile device 2 configure a known smart entry system. In other words, the vehicle mounted device 1 transmits the request signal to the mobile device 2 through the LF transmitting unit 11. After receiving the request signal through the LF receiving unit 21, the mobile device 2 transmits a response signal including an identification code (ID code) for identifying the mobile device 2 to the vehicle mounted device 1 through the UHF transmitting unit 22. The ECU 10 compares the received ID code against a master code preliminarily stored in the memory 10a. When comparison success in which both of those codes match with each other is made, the ECU 10 outputs a command for executing a control including the permission of the locking or unlocking of the door, or the permission of the engine start, or a setting of a vehicle device based on the received ID code (associated with the user) before a vehicle owner gets on the vehicle. The vehicle device may include, for example, an air conditioning control unit 53, a door locking control unit 57, an engine control unit 58, an illumination control unit 59, a seat arrangement control unit 60, or a mirror position control unit 61.

The mobile terminal 3 may be provided by, for example, a tablet device typified by a known smartphone. The tablet device is a generic name of personal digital assistance devices in which a touch panel is mounted on a display portion such as a liquid crystal display, and operated by a finger. The mobile terminal 3 includes a control unit 30 (corresponding to a calculation unit), a BT communication unit 31 (corresponding to a mobile terminal communication unit) connected to the control unit 30, a position detection unit 32, a memory 33 provided by a non-volatile storage medium such as a flash memory, and a parking position acquisition unit 35 (an operation unit 34 will be described later).

Similar to the control unit 20 of the mobile device 2, the control unit 30 is provided by a computer. The memory 33 stores a mobile terminal control program. The CPU executes the mobile terminal control program to realize various functions of the mobile terminal 3. When a smartphone is used as the mobile terminal 3, the mobile terminal control program is included in an application software which operates on an OS (operating system).

The BT communication unit 31 transmits data to the BT communication unit 26 of the mobile device 2 with the use of the short-range wireless communication technique described above.

The position detection unit 32 includes, for example, a GPS receiving unit that receives radio waves (GPS signal) from a known GPS satellite, and detects a position of the mobile terminal 3 on the basis of the received GPS signal.

The parking position acquisition unit 35 acquires the parking position of the vehicle 101 with the use of the above technique in which the smartphone per se automatically recognizes the getting-off of the user from the vehicle, and acquires and stores the parking position as the GPS data.

FIG. 2 illustrates a connection configuration between the ECU 10 and other devices mounted on the vehicle 101 (an operation unit 14 will be described later). The ECU 10 is connected with, in addition to the above engine switch 15, an audio apparatus 51, a navigation apparatus 52, the air conditioning control unit 53, a lighting control unit 54, a door open/close control unit 55, a window open/close control unit 56, a door locking control unit 57, the engine control unit 58, the illumination control unit 59, the seat arrangement control unit 60, the mirror position control unit 61, and a wireless control unit 62 in a data communicable manner. The ECU 10 and these control units and devices (hereinafter correctively referred to as "vehicle devices") may be connected directly to each other, or may be connected to a known vehicle interior LAN through a communication I/F (interface) 10b (corresponding to an output unit).

A configuration of the audio apparatus 51 is well known, and its detailed description will be omitted. It is needless to say that the audio apparatus 51 may include a television, or may be operationally coupled with the navigation apparatus 52.

The navigation apparatus 52 detects the position of the vehicle, displays the current position of the vehicle on electronic map data, and guides a route to a set destination. Since a configuration of the navigation apparatus 52 is well known, detailed description will be omitted.

The air conditioning control unit 53 controls the driving of an air conditioning apparatus on the basis of an operation signal from the operation unit (not illustrated) by the user. As a result, the air conditioning control unit 53 regulates a temperature and a humidity of the vehicle interior.

The lighting control unit 54 controls the on/off operation of lighting devices equipped to the vehicle 101, such as headlights, tail lights, direction indicator lights, auxiliary lights, room lamps, and courtesy lamps.

A door open/close control unit 55 controls the opening/closing operation of a power sliding door of the vehicle 101. The power sliding door may include a power back door.

A window open/close control unit 56 controls the opening and closing operation of windows in the vehicle 101. The windows may include power windows.

The door locking control unit 57 controls the locking or unlocking of the door locking device of the vehicle 101.

The engine control unit 58 calculates a fuel injection amount and an ignition timing on the basis of an accelerator position, an intake air temperature, and an engine coolant temperature, and controls the rotation of the engine.

The illumination control unit 59 controls, for example, the illuminance, lighting pattern, and lighting timing of decoration illuminations other than the above lighting devices.

The seat arrangement control unit 60 stores a seat position set by the user in advance, and controls the seat position.

The mirror position control unit 61 stores a mirror position set by the user in advance, and controls the mirror position.

The wireless control unit 62 controls a wireless LAN environment in the vehicle interior.

In the configuration described above, the vehicle includes one or more vehicle devices 51 to 62 each of which operationally controls a predetermined function, and the vehicle mounted device includes a selection unit 10 that selects the function when the vehicle side communication unit 12 receives the approach information, and an output unit 10b that outputs a control signal for operationally controlling the selected function to the corresponding vehicle device. With the above configuration, the vehicle device can be operated according to a notification from the mobile device to the vehicle mounted device. In the above configuration, since only the receiving function of the vehicle side communication unit needs to be set in activated state, there is no need to put the vehicle device into a standby state in advance. Thus, a reduction in dark current can be expected.

Figure 3:
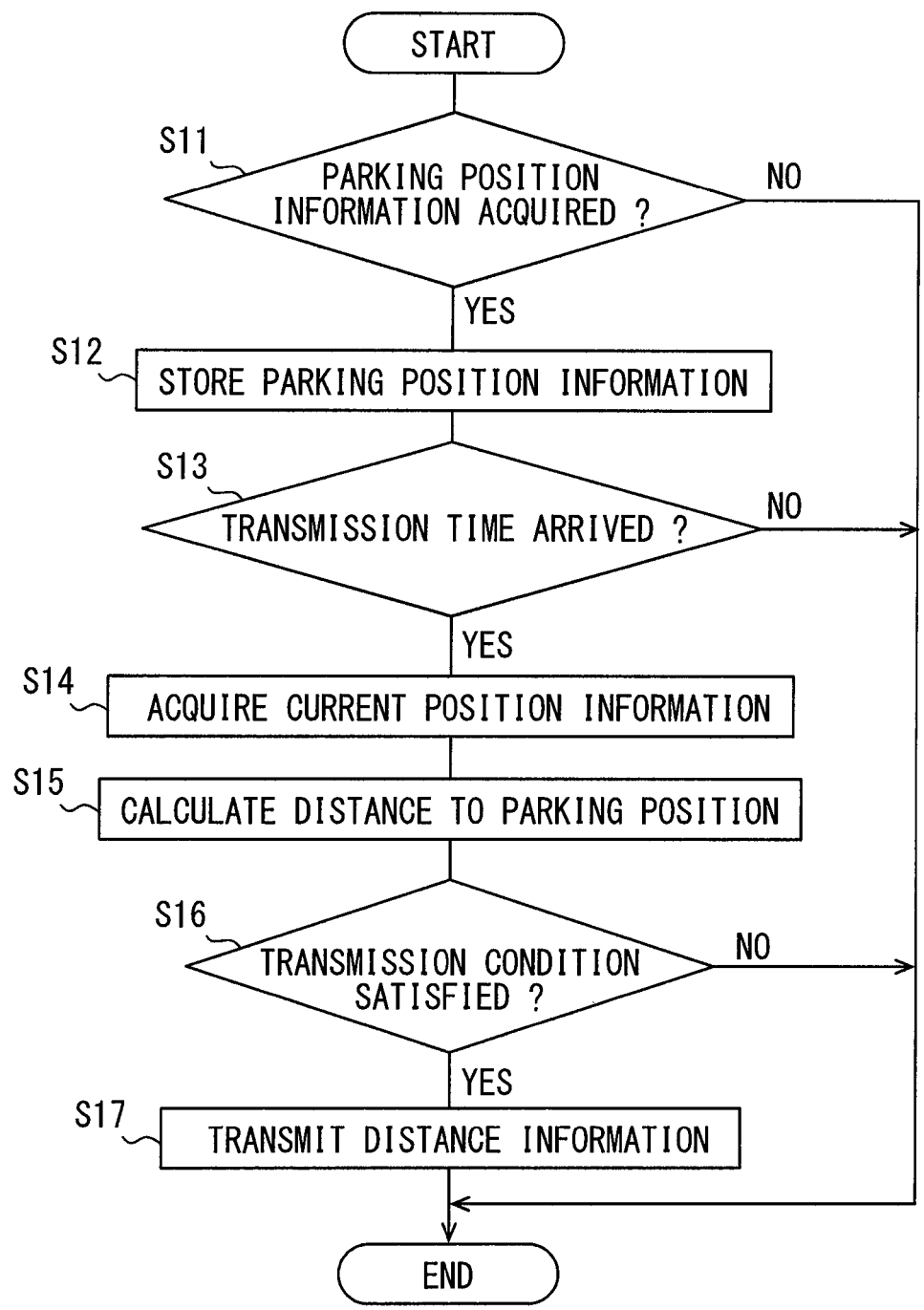
FIG. 3 is a flowchart illustrating a distance information transmitting process executed by a mobile terminal.

A distance information transmitting process in FIG. 3 will be described. The process is included in the mobile terminal control program of the mobile terminal 3, and repetitively executed at predetermined intervals by the control unit 30. First, the parking position acquisition unit 35 determines whether the parking position information of the vehicle 101 is acquired or not.

When the parking position information is not acquired (S11: NO), the process is completed. On the other hand, when the parking position information is acquired (S11: YES), the acquired parking position information is stored in the memory 33 (S12).

Then, it is determined whether a transmission time for transmitting data to the mobile device 2 is arrived or not. When the time has not arrived (S13: NO), the process is completed. On the other hand, when the time is arrived (S13: YES), current position information is acquired from the position detection unit 32 (S14). Then, a distance between the current position of the mobile terminal 3 and the parking position stored in the memory 33 is calculated (S15).

Then, it is determined whether a predetermined transmission condition is satisfied or not. The transmission condition is selected from any one of conditions described below. When the calculated distance decreases shorter than a predetermined threshold (for example, 30 meters), it is determined that the transmission condition is satisfied. When the calculated distance falls within a predetermined range (for example, 1.5 to 30 meters), it is determined that the transmission condition is satisfied.

When the transmission condition is not satisfied (S16: NO), the process is completed. On the other hand, When the transmission condition is satisfied (S16: YES), the distance information including the calculated distance is transmitted to the mobile device 2 (S17).

Figure 4:
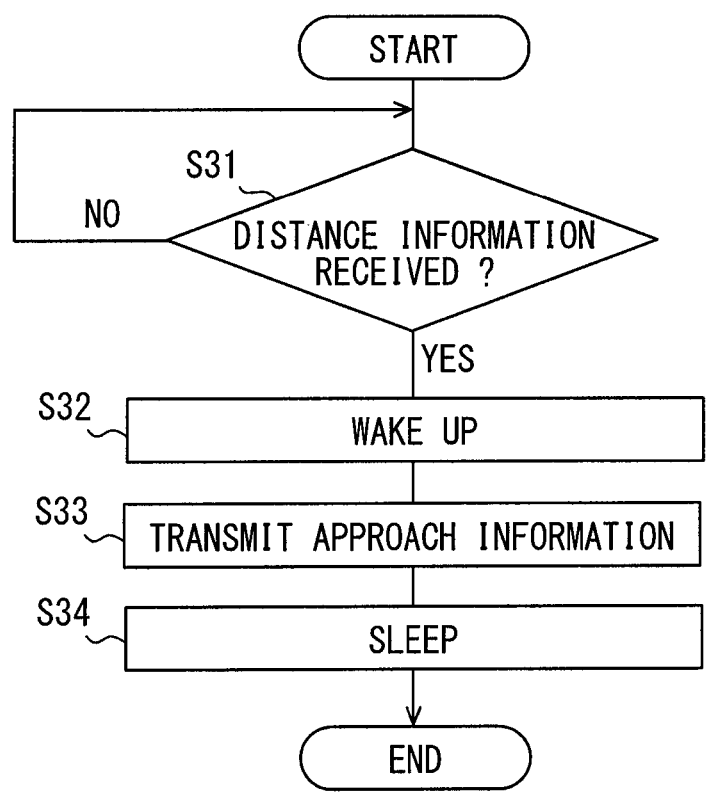
FIG. 4 is a flowchart illustrating an approach information transmitting process executed by a mobile device.

An approach information transmitting process in FIG. 4 will be described. The process is included in the mobile device control program of the mobile device 2, and repetitively executed by the control unit 20 at predetermined intervals. It is assumed that the mobile device 2 normally operates in the power saving mode. First, when the distance information is received from the mobile terminal 3 through the BT communication unit 26 (S31: YES), the control unit 20 wakes up (S32) and transmits the received distance information as the approach information to the vehicle mounted device 1 through the UHF transmitting unit 22 (S33). Thereafter, the control unit 20 sleeps (S34).

The distance may be calculated by the mobile device 2 based on the distance information including the current position of the mobile terminal and the parking position of the vehicle, and the transmission condition of the approach information may be determined by the mobile device 2. Since updating of the program and parameter setting can be easily executed by the mobile terminal 3 compared with the mobile device 2, it is desirable that the mobile device 2 performs relaying of information.

A device control process in FIG. 5 will be described. The process is included in the vehicle mounted device control program of the vehicle mounted device 1, and repetitively executed by the ECU 10 at predetermined intervals. First, when the approach information is received from the mobile device 2 through the UHF receiving unit 12 (S51: YES) in a power saving mode of the mobile device 2, the vehicle mounted device 1 wakes up, and the distance information included in the approach information is acquired by the vehicle mounted device 1 and is stored in the memory 10*a* (S52). The distance information is stored retroactively for a predetermined period.

Then, it is determined whether the transmission condition of the request signal is satisfied or not. The transmission condition will be described below.

When a predetermined duration elapses after receiving previous approach information, it is determined that the transmission condition of the request signal is satisfied. In other words, this condition corresponds to a situation in which an owner of the mobile device 2 returns to the vehicle 101 after the owner has moved away from the vehicle 101 once. Suppose that the distance between the mobile device 2 and the vehicle 101 is within a range of 10 to 30 meters and the distance conceivably falls outside of a normal arrival range of the LF radio wave. In this case, the LF radio wave is transmitted with an increased transmission power so that the transmitted radio wave is reachable to the mobile device 2.

When the distance between the mobile device 2 and the vehicle 101 falls within the above-mentioned transmission area, it is determined that the transmission condition of the request signal is satisfied. In other words, when the distance between the mobile device 2 and the vehicle 101 corresponds to the normal transmission range of the LF signal, it is determined that the transmission condition of the request signal is satisfied.

When the transmission condition is satisfied (S53: YES), the request signal is transmitted (S54). Thereafter, when the response signal is received from the mobile device 2 (S55: YES), the ID code is checked as described above (S56). When the checking result is not normal (S57: NO), the process is completed.

On the other hand, when the checking result is normal (S57: YES), a behavior of is estimated on the basis of the history of the distance information (S58).

In S58, it is estimated whether the mobile device 2 or the mobile terminal 3 moves closer to the vehicle 101 or moves away from the vehicle 101. When moving closer to or moving away from the vehicle 101, the speed of the mobile device 2 or the mobile terminal 3 may be calculated or an approach direction may be estimated. For example, when the distance to the vehicle 101 is equal to or less than 1.5 meter, in other words, when the mobile device 2 falls within the above-described transmission area, it is estimated that the mobile device 2 moves closest to the vehicle 101.

In S58, it may be confirmed whether the distance is changed or not. When the distance is not changed, it is estimated that the mobile device 2 remains within a predetermined distance from the vehicle 101.

Regarding the configuration of the above step S56, the vehicle side communication unit 11 transmits a request signal which requests for an ID code to be used in identification of the mobile device to the first mobile device communication unit 21 in response to a reception of the approach information, the first mobile device communication unit 22 transmits a response signal including the ID code in response to a reception of the request signal, the vehicle mounted device includes a checking unit 10 that checks the ID code against a master code stored in advance when receiving the ID code, and the selection unit selects the function under a condition that the checking is normally performed. With this configuration, since the vehicle device does not operate according to the approach information from a mobile device (cannot be correctly checked) other than the user's mobile device, the security of the vehicle can be ensured.

Regarding the configuration of estimating the approach direction of the mobile device 2 or the mobile terminal 3, the distance information includes the parking position of the vehicle and the position of the mobile terminal, the vehicle mounted device includes the estimation unit 10 that estimates the approach direction of the mobile terminal on the basis of the parking position of the vehicle and the position of the mobile terminal, and the selection unit selects the function on the basis of the approach direction of the mobile terminal. With the above configuration, a fine control is enabled, such as turning on of the lights only in an approach direction of the user, or opening of windows only on an approach direction side of the user. In addition, power consumption can be reduced since unnecessary operation is not carried out.

Then, any one of the vehicle devices 51 to 62 which is to be controlled according to the estimated behavior and the operation to be executed by the selected vehicle device are selected (S59). The memory 10*a* stores, for each of the vehicle devices, a data table which defines the operations to be implemented in association with the behaviors of the mobile device 2 or the mobile terminal 3. The selection of vehicle device and the operation is made with reference to the control data table.

For example, an operation history of each vehicle device during a period while the user who carries the mobile device 2 moves closer to the vehicle (including the above behavior), gets on the vehicle, and starts travelling is stored in the memory 10a. The vehicle device to be controlled and the control operation thereof may be selected from the operation history.

In the above configuration, the vehicle mounted device includes the history storage unit 10a that stores history of functions operationally controlled after receiving the approach information, and the selection unit selects the function on the basis of the history of the functions. The history of functions includes the function automatically executed and the function executed by the user. With the above configuration, a desired function can be operationally controlled without any setting by the user in advance, and improved convenience and comfort can be provided to the user.

In addition, a function may be selected for each user (that is, for each ID code). In this configuration, the approach information includes the ID code for identifying the mobile device, the vehicle mounted device includes the storage unit 10a that stores the function to be executed for each ID code, and the selection unit selects the function on the basis of the ID code. Even with this configuration, the desired function can be operationally controlled without any setting by the user in advance, and improved convenience and comfort can be provided to the user.

In addition, an operation state of the vehicle device immediately before the occupant gets off the vehicle, for example, immediately before an engine stop is stored in the memory 10a. The vehicle device to be controlled and its control operation may be selected according to the operation state.

The getting-off of the occupant may be determined under a condition that the engine is stopped, or under a condition that the vehicle is stopped, or under a condition that a shift lever is moved to a position of "parking", or under a condition that no occupant is present in the vehicle interior after all of the door locking devices have been locked, or under a condition that a parking brake is operated. These vehicle related states can be acquired from another vehicle device through a communication I/F 10b.

In the above configuration, the vehicle mounted device includes the state storage unit 10a that stores the state of the vehicle when the user gets off the vehicle, and the selection unit selects the function on the basis of the state of the vehicle. With the above configuration, since operation of each vehicle device returns to an operation state before the occupant gets off the vehicle without any setting by the user in advance, improved convenience and comfort can be provided to the user.

In addition, for the vehicle device to be operated when the user comes closer to the vehicle, the control operation may be set by the user. The setting is performed by the user using the operation unit 14 (refer to FIG. 2) including an operation switch group such as mechanical switches in the vehicle mounted device 1, the operation unit 24 (corresponding to the setting unit) of the mobile device 2, or the operation unit 34 (corresponding to the setting unit) including the touch panel of the mobile terminal 3. When the setting is conducted by the mobile device 2 or the mobile terminal 3, the set operation is transmitted to the vehicle mounted device 1 through a wireless communication. The set operation is stored in the memory 10a.

The above configuration includes the setting units 14, 24, and 34 for setting the function to be operationally controlled by the user, and the selection unit of the vehicle mounted device selects the function on the basis of the user's setting. With this configuration, the function can be operationally controlled according to the user's preference, and improved convenience and comfort can be provided to the user.

Finally, a control command corresponding to the control operation is output to the appropriate vehicle device (S60). The vehicle device that has received the control command operates on the basis of the control operation.

For example, the control operation can be exemplified as follows.

In a case where there exists a music reproduced immediately before parking of the vehicle when it is determined that the mobile device moves closer to the vehicle, the audio apparatus 51 sets the music to a reproducible state (pause state). When there exists a broadcasting program watched or heard by the user immediately before parking of the vehicle, a reception of the broadcasting channel is activated, but reproduction of the image or the audio from the broadcasting channel is kept in deactivated state.

When it is determined that the mobile device moves closer to the above transmission area, the reproduction of the music may be started. Similarly, when it is determined that the movable device moves closer to the above transmission area, reproduction of the image or the audio from the broadcasting channel may be activated.

When it is determined that the mobile device moves closer to the vehicle, in a case where a next destination has been set, the navigation apparatus 52 starts a route guidance. In a case where a next destination is not set, a route to a default spot, such as user's home may be searched as the destination and the route guidance may be started. Since the route guidance is conducted in the vehicle's stopped state, that is no route guidance is substantially conducted. Thus, this configuration does not impair the user's convenience.

When it is determined that the mobile device moves closer to the vehicle, the air conditioning control unit 53 may start operate in the same operation mode with the mode immediately before parking of the vehicle. In this case, an air volume may be increased when the mobile device 2 moves closer to the vehicle 101.

When the distance falls within the preset range, the lighting control unit 54 may turn on or blinks a preset light for the purpose of informing the parking position of the vehicle 101, or a horn may be sounded. The lighting mode may be changed according to the distance between the mobile device 2 and the vehicle 101, or according to the approach direction of the mobile device 2.

When it is determined the mobile device moves closer to the vehicle within the above transmission area, the door open/close control unit 55 estimates the approach direction, and automatically opens a door in the approach direction. It is desirable that the normal result of ID checking is set as a precondition in the smart entry system.

When it is determined that the mobile device moves closer to the vehicle, the window open/close control unit 56 opens the window at a predetermined opening ratio for ventilation of the vehicle interior. The opening ratio may be increased when the mobile device 2 comes closer to the vehicle 101. In this case, the approach direction may be estimated, and only the window in the approach direction may be opened.

The door locking control unit 57 permits the locking or unlocking of the door locking device only when the distance falls within the above transmission area (normal function of the smart entry system).

The engine control unit 58 permits the engine start only when the distance falls within the above transmission area (normal function of the smart entry system).

The illumination control unit 59 changes the illumination intensity, the lighting color, and the lighting pattern according to the distance.

The seat arrangement control unit 60 controls the position of seat to obtain the seat position set by the user in advance.

When the mobile device moves closer to the vehicle within the predetermined distance, the mirror position control unit 61 changes the mirror from a folded state to an unfolded state.

When the mobile device moves closer to the vehicle within the predetermined distance, the wireless control unit 62 enables a wireless LAN.

In the configuration where the control operations of the vehicle devices are changed as the mobile device 2 moves closer to the vehicle 101, the selection unit of the vehicle mounted device selects the function on the basis of the distance information included in the approach information. With this configuration, for example, the function (for example, blinking of the lighting device) which is considered not to impair the security can be selected when the approach is started. On the other hand, the function (for example, unlocking of the door locking device) considered to impair the security can be selected after the mobile device moves close to the vehicle. With this operation, the security of the vehicle can be ensured.

The function may include at least one of an engine start of the vehicle or locking/unlocking of the door by the locking device of the vehicle. In the smart entry system, up to now, the communication starts due to the LF radio wave from the vehicle mounted device. In other words, the LF radio wave is periodically transmitted regardless of whether the mobile device is present or not. On the other hand, in the configuration of the present disclosure, the LF radio wave is transmitted after reception of the approach information from the mobile device. That is, the vehicle mounted device is configured to receive the approach information. Thus, in the vehicle mounted device, the periodic transmission of the LF radio wave becomes unnecessary, and the dark current can be reduced correspondingly. The activation timings (in other words, distance between the mobile device and the vehicle) of the operations, such as LF radio wave transmission, the permission of the engine start of the vehicle, the permission of the locking or unlocking operation of the door locking device of the vehicle may be set similar to the conventional smart entry system. With this configuration, the security of the vehicle can be ensured.

Figure 5:
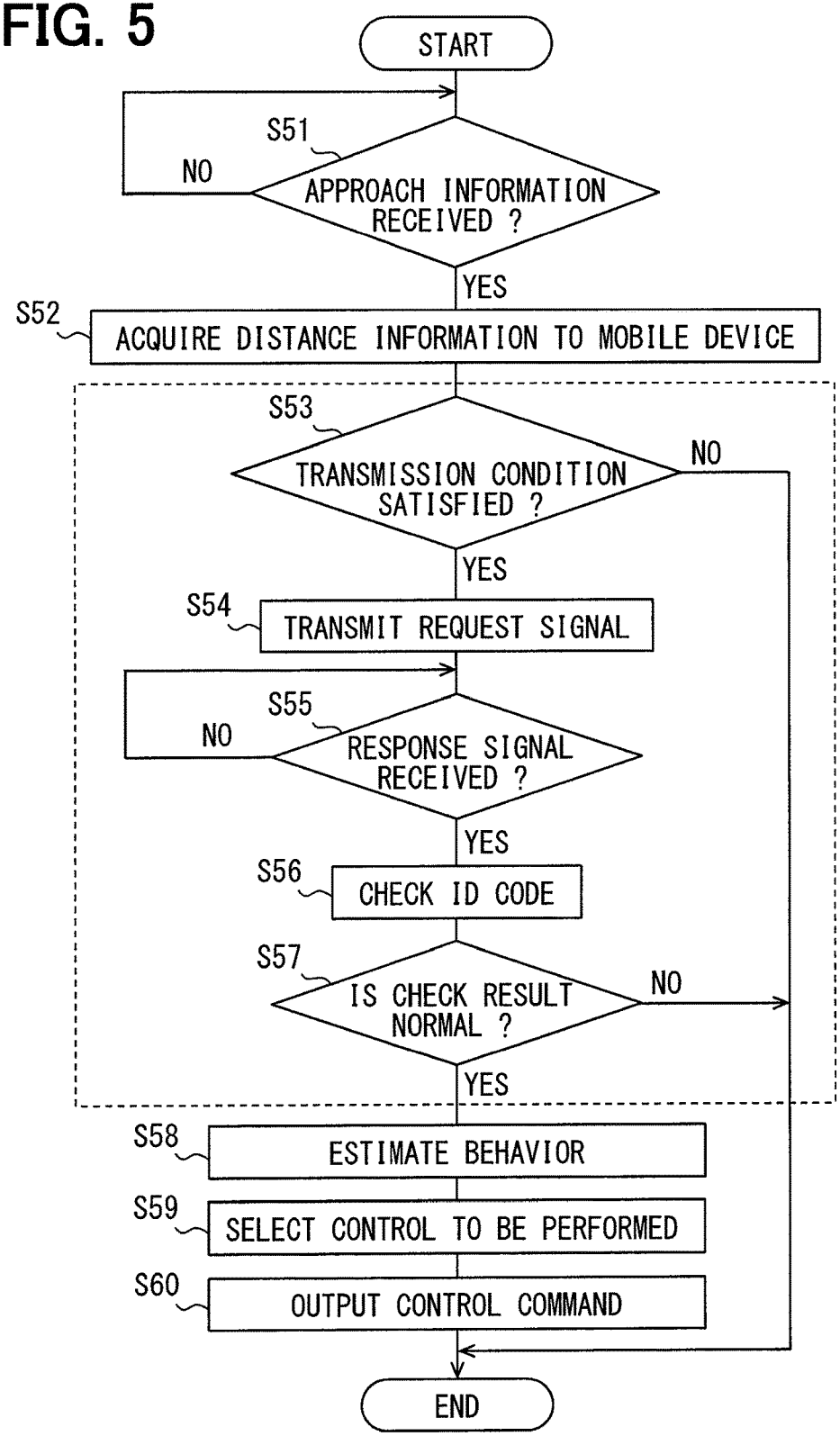
FIG. 5 is a flowchart illustrating a device control process executed by the vehicle mounted device.

In the process shown in FIG. 5, in the functions other than the normal functions of the smart entry system, the checking of ID code may not be performed. In this case, steps S53 to S57 may not be executed. Herein, the normal functions of the smart entry system may include the permission of the locking or unlocking operation of the door locking device, the permission of the engine start, or the like.

In the conventional art, a communication trigger is conducted on the vehicle side. In other words, the communication is started by the transmission of the LF radio wave from the vehicle mounted device. Usually, with an increase of the propagation distance of the LF radio wave, the dark current is increased or the security is lowered. Thus, the realization of the longer propagation distance is difficult.

According to the above-described vehicle communication system, the communication trigger is provided in an external device other than the vehicle. For example, the external device (that is, the mobile terminal) such as a smartphone including a GPS receiver recognizes its own position and the approach to the vehicle (area where the communication is established), and transmits the distance information to the mobile device. The mobile device transmits the distance information to the vehicle as the approach information. As a result, the vehicle mounted device has no need to periodically transmit the radio waves until receiving the radio wave from the mobile device, and a reduction in the dark current can be expected.

In addition, in the conventional art, in an area where the mobile device can detect the LF radio wave, malicious operation such as the interception, interference, unauthorized access of communications, or the theft of the vehicle by a third party other than the user may be likely to be induced.

According to the vehicle communication system, because the distance information is transmitted after the mobile terminal recognizes the approach to the vehicle, the user's unintentional operation is not conducted. Thus, the malicious operation is unlikely to occur, and the security can be ensured.

It is noted that a flowchart or the processing of the flowchart in the present disclosure includes units (also referred to as steps), each of which is represented, for instance, as S11. Further, each unit can be divided into several sub-units while several units can be combined into a single unit. Furthermore, each of thus configured units can be also referred to as a circuit, device, module, or means.

Each or any combination of units explained in the above can be achieved as (i) a software section in combination with a hardware section (e.g., computer) or (ii) a hardware section, including or not including a function of a related apparatus; furthermore, the hardware section (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle communication system comprising:
   a vehicle mounted device equipped to a vehicle and including a vehicle side communication unit;
   a mobile device carried by a user and including a first mobile device communication unit that performs a wireless communication with the vehicle side communication unit; and
   a mobile terminal carried by the user and including a mobile terminal communication unit that performs a wireless communication with a second mobile device communication unit included in the mobile device, wherein
   the mobile terminal includes:
      a parking position acquisition unit acquiring a parking position of the vehicle when the user gets off the vehicle;
      a position detection unit detecting a position of the mobile terminal; and
      a calculation unit calculating a distance between the parking position and the mobile terminal based on the parking position and the position of the mobile terminal,
   when the distance that is calculated falls within a predetermined range, the mobile terminal communication unit transmits, to the second mobile device communication unit, distance information including the distance, and when the second mobile device communication unit receives the distance information, the first mobile device communication unit transmits, to the vehicle side communication unit, approach information including the distance information, wherein the vehicle includes one or more vehicle devices each of which operationally controls a function which is predetermined, and the vehicle mounted device includes:
    a selection unit selecting the function when the vehicle side communication unit receives the approach information; and
    an output unit outputting, to a corresponding vehicle device among the one or more vehicle devices, a control signal for operationally controlling the function that is selected.

2. The vehicle communication system according to claim 1, wherein
the selection unit of the vehicle mounted device selects the function based on the distance information included in the approach information.

3. The vehicle communication system according to claim 1, wherein
the approach information includes an identification code for identifying the mobile device,
the vehicle mounted device includes a storage unit that stores the function to be executed corresponding to the identification code, and the selection unit selects the function based on the identification code.

4. The vehicle communication system according to claim 1, further comprising
a setting unit setting the function to be operationally controlled in response to a manipulation made by the user,
wherein the selection unit of the vehicle mounted device selects the function based on the manipulation made by the user on the setting unit.

5. The vehicle communication system according to claim 1, wherein
the vehicle mounted device further includes a history storage unit that stores a history of the function operationally controlled after receiving the approach information, and
the selection unit selects the function based on the history of the function.

6. The vehicle communication system according to claim 1, wherein
the vehicle mounted device further includes a state storage unit that stores a state of the vehicle when the user gets off the vehicle, and
the selection unit selects the function based on the state of the vehicle.

7. The vehicle communication system according to claim 1, wherein
the vehicle side communication unit transmits, to the first mobile device communication unit, a request signal that requests for an identification code for identifying the mobile device in response to a reception of the approach information,
the first mobile device communication unit transmits a response signal including the identification code in response to a reception of the request signal,
the vehicle mounted device further includes a checking unit that checks the identification code by comparing the identification code with a preliminarily stored master code when receiving the identification code, and
the selection unit selects the function under a condition that a checking result of the identification code is normal.

8. The vehicle communication system according to claim 7, wherein
the function includes at least one of an engine start of the vehicle, or a locking or unlocking of the vehicle by a door locking device.

9. The vehicle communication system according to claim 1, wherein
the distance information includes the parking position of the vehicle and the position of the mobile terminal,
the vehicle mounted device further includes an estimation unit that estimates an approach direction of the mobile terminal based on the parking position of the vehicle and the position of the mobile terminal, and
the selection unit selects the function based on the approach direction of the mobile terminal.

\* \* \* \* \*